United States Patent [19]

Naidu et al.

[11] Patent Number: 5,805,983

[45] Date of Patent: Sep. 8, 1998

[54] SYSTEM AND METHOD FOR EQUALIZING THE DELAY TIME FOR TRANSMISSION PATHS IN A DISTRIBUTED ANTENNA NETWORK

[75] Inventors: Arun Naidu, Raleigh; Jacque Huffman, Cary, both of N.C.

[73] Assignee: Ericsson Inc., Research Triangle Park, N.C.

[21] Appl. No.: 683,382

[22] Filed: Jul. 18, 1996

[51] Int. Cl.[6] .................................................. H04B 17/00
[52] U.S. Cl. ........................................... 455/67.6; 455/503
[58] Field of Search .................................. 455/67.6, 54.1, 455/33.1, 73, 502, 503, 500, 524, 525; 370/508, 517, 519

[56] References Cited

U.S. PATENT DOCUMENTS

| | | | |
|---|---|---|---|
| 4,417,249 | 11/1983 | Zscheile, Jr. | 343/379 |
| 4,696,052 | 9/1987 | Breeden | 455/51 |
| 4,849,990 | 7/1989 | Ikegami et al. | 375/40 |
| 5,014,344 | 5/1991 | Goldberg | 455/51 |
| 5,105,439 | 4/1992 | Bennett et al. | 375/10 |
| 5,117,503 | 5/1992 | Olson | 455/51.1 |
| 5,127,101 | 6/1992 | Rose, Jr. | 455/51.1 |
| 5,172,396 | 12/1992 | Rose, Jr. et al. | 375/107 |
| 5,222,162 | 6/1993 | Yap et al. | 385/14 |
| 5,280,629 | 1/1994 | Lo Gablo et al. | 455/51.2 |
| 5,361,398 | 11/1994 | Christian et al. | 455/51.2 |
| 5,448,758 | 9/1995 | Grube et al. | 455/51.2 |
| 5,471,474 | 11/1995 | Grobicki et al. | 370/85.2 |
| 5,473,638 | 12/1995 | Marchetto et al. | 375/356 |
| 5,477,539 | 12/1995 | Brown | 370/84 |
| 5,485,632 | 1/1996 | Ng et al. | 455/51.2 |
| 5,542,119 | 7/1996 | Grube et al. | 455/51.2 |
| 5,614,914 | 3/1997 | Bolgiano et al. | 342/364 |

OTHER PUBLICATIONS

Glenayre GL–C2000 version 2.3 Transmitter controller's manual, pp. 69–72, May 28, 1996.

A. Morris, "Cable in PCS: Pioneering Telephony's Future Technology," *Communications Technology*, pp. 42, 45, and 47–49, Dec. 1994.

H.E. Young, "PCS Over Cable—An Opportunity for Some CATV Companies," *Telephony*, pp. 70–72, Jan. 30, 1995.

C.A. Eldering et al., "CATV Return Path Characterization for Reliable Communications," *IEEE Communications Magazine*, pp. 62–69, Aug. 1995.

*Primary Examiner*—Tommy P. Chin
*Assistant Examiner*—David R. Vincent
*Attorney, Agent, or Firm*—Burns, Doane, Swecker & Mathis, L.L.P.

[57] ABSTRACT

A communication system and method are provided for equalizing delay of transmission paths in a distributed antenna network. The distributed antenna network includes a plurality of remote antenna units, a central unit or a base station connected to the remote antenna units by transmission media, where each connection between the base station and one of the remote antenna units forms a separate transmission path having an associated delay time, a delay detector for determining the associated delay time of the separate transmission paths for each of the remote antenna units, and a delay compensator for adjusting the associated delay times in response to the delay detectors so that all of the associated delay times are substantially equalized. The system and method allow the delay parameters for the entire network to be set upon installation and then to be periodically updated without physical intervention by an operator. The detection and compensation allow for equalization of delay time differences that could not otherwise be compensated in the base stations or mobile stations of conventional systems and methods. Furthermore, the equalization synchronizes the bursts so that air frame timing between cells served by the remote antenna units is enhanced and the hand-off performance therebetween is improved.

14 Claims, 6 Drawing Sheets

SYSTEM AND METHOD FOR EQUALIZING THE DELAY TIME FOR TRANSMISSION PATHS IN A DISTRIBUTED ANTENNA NETWORK

BACKGROUND

The present invention is directed to a system and method for equalizing delay times for transmission paths which connect a plurality of remote antenna units in a distributed antenna network by transmission media. More particularly, the present invention detects the delay parameters associated with each separate transmission path which connects a remote antenna unit to a central unit or a base station and then adjusts the delay time for each transmission path so that the delay times for all of the remote antenna units are equalized. Because the remote antenna units are physically connected to the central unit or base station by separate transmission paths of different lengths and types of transmission media, such connections may create intersymbol interference that is beyond the compensation capabilities of conventional systems. The system and method of the present invention actively compensate for such delay times without any manual intervention. The present invention also synchronizes bursts so that air frame timing between cells served by the remote antenna units is enhanced and the hand-off performance therebetween is improved.

Figure 1:
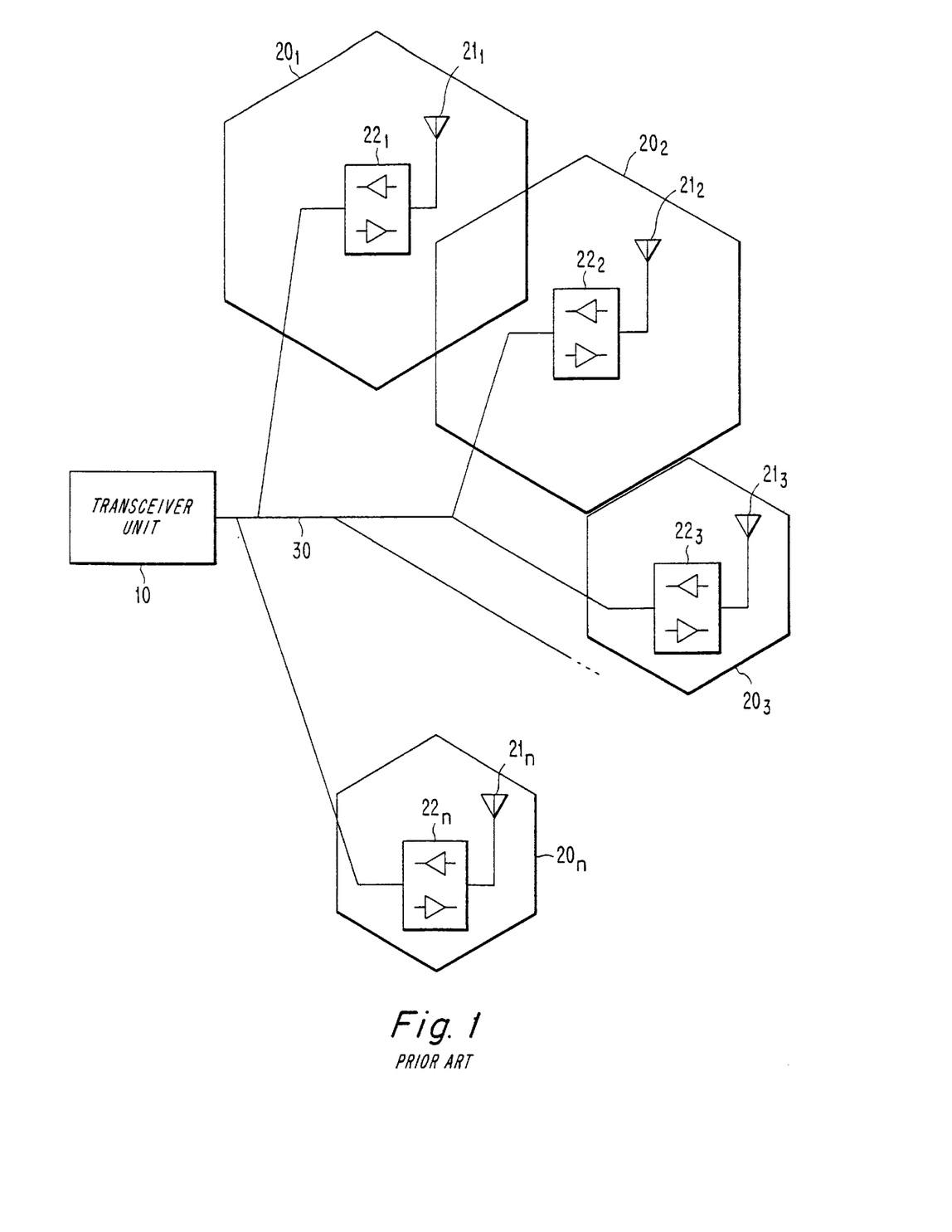
FIG. 1 illustrates a conventional distributed antenna network.

As personal communication services (PCS) evolve as the next generation of cellular telephone technology, systems and techniques for simply and efficiently transmitting and receiving communication signals are being investigated. One known system is a distributed antenna network (which is also referred to as a multicast network) which provides coverage over substantial areas by a plurality of remote antenna units. An example of a distributed antenna network is illustrated in FIG. 1 where an individual transceiver 10 is connected to a plurality of cells $20_1, \ldots 20_n$ by transmission media 30 which transports radio signals between the transceiver unit 10 and the cells $20_1 \ldots 20_n$. Each of the cells $20_1, \ldots 20_n$ include remote antenna units $21_1, \ldots 2_n$. The remote antenna units $21_1, \ldots 21_n$ may be connected to the transmission media 30 by frequency converting circuitry $22_1, \ldots 22_n$ for certain applications.

Various infrastructures are being developed and modifications of existing infrastructures are of great interest as alternatives for PCS because they are fully capable of providing high quality signals at lower costs than traditional cellular infrastructures. For example, CATV infrastructures have been modified for use in PCS. Such modifications include the CATV infrastructures using a hybrid fiber/coax (HFC) cable infrastructure to increase capacity and improve service quality. Although it is theoretically possible for any CATV infrastructure to support PCS with the proper modifications, the HFC cable infrastructure offers an attractive option as an economical alternative to wireless providers seeking to avoid the high cost of network construction.

Figure 2:
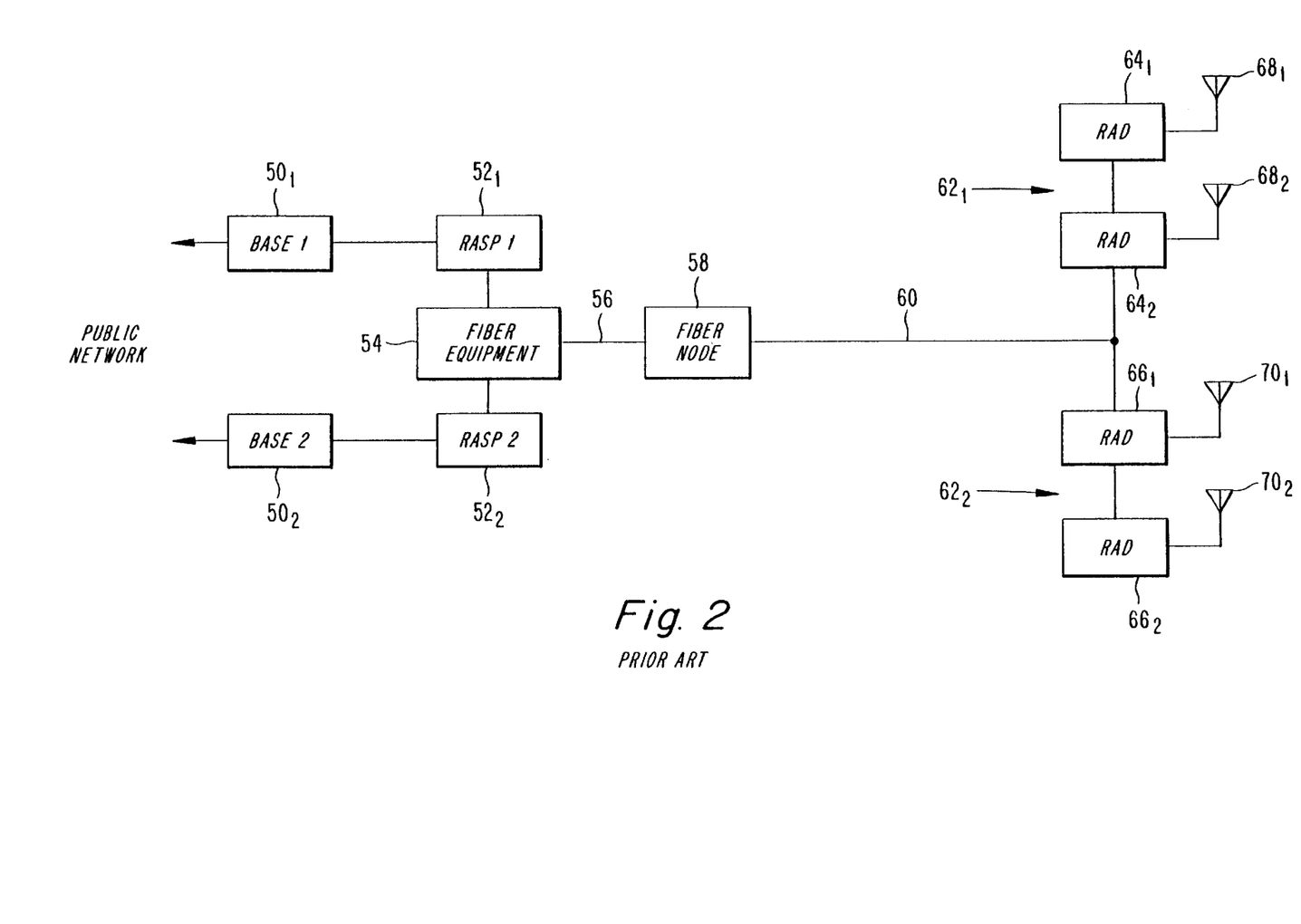
FIG. 2 is a block diagram of a known CATV infrastructure which supports PCS.

FIG. 2 illustrates the basic components of a CATV infrastructure used to support PCS. In FIG. 2, base station equipments $50_1$ and $50_2$ are connected to a public network such as a public switched telephone network. Remote antenna signal processors (RASPs) $52_1$ and $52_2$ connect the base station equipments $50_1$ and $50_2$ to a fiber equipment 54. The fiber equipment 54 is connected to a fiber node 58 by fiber optic cable 56 and the fiber node 58 is connected to remote antenna driver (RAD) nodes $62_1$ and $62_2$ by two-way coaxial cable 60. The RAD nodes $62_1$ and $62_2$ each include a group of RADs $64_1$ and $64_2$ and $66_1$ and $66_2$ respectively connected to antennas $68_1$, $68_2$, $70_1$, and $70_2$. This CATV infrastructure converts radio frequency signals into CATV frequency signals usable in the existing CATV infrastructure and converts CATV frequency signals back into radio frequency signals for broadcast. More specifically, the RASPs $52_1$ and $52_2$ convert the radio frequency signals from the base station equipments $50_1$ and $50_2$ and then send the converted signals in the downlink path toward the appropriate fiber node 58 and onto the coaxial cable 60.

The RADs $64_1$, $64_2$, $66_1$ and $66_2$ are connected to the coaxial cable 60 for converting CATV frequency signals into assigned radio frequency signals. Radio frequency signals may be received by the RADs $64_1$, $64_2$, $66_1$ and $66_2$ which convert these signals into signals of frequencies suitable for transmission in the uplink path of the CATV infrastructure. Thereafter, the RASPs $52_1$ and $52_2$ convert the upstream CATV frequency signals back into radio frequency signals for processing by the base station equipments $50_1$ and $50_2$. This CATV infrastructure also may accommodate equipment for multiple modulation schemes, such as time division multiple access (TDMA), code division multiple access (CDMA) and frequency division multiple access (FDMA).

Radio telephony systems may utilize this CATV infrastructure by operating on available portions of the radio frequency spectrum over fiber optic and coaxial cables which are widely available in urban areas so that such systems may be installed to take advantage of this existing infrastructure. The large installed base of fiber optic and coaxial cables used by CATV operators may thereby be effectively exploited at a minimal cost by this infrastructure which distributes the signals to the appropriate antenna locations. However, in these distributed antenna systems, it is likely that a signal may be received by more than one of the remote antenna units and where digital modulation is used, transmission problems often arise. Because the remote antenna units are connected by transmission media having physically separate transmission paths back to the transceiver or base station, the time delays due to the variations in the lengths of the transmission paths and/or types of transmission media typically cause transmission problems that cannot be fully compensated by conventional equalization techniques at the base station or the mobile stations.

Figure 3:
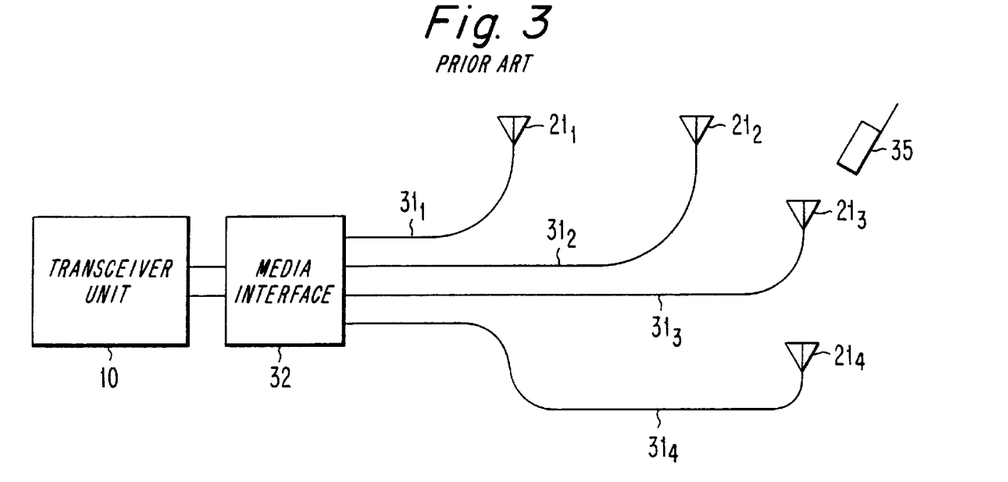
FIG. 3 illustrates various transmission paths in a conventional distributed antenna network.

FIG. 3 generally illustrates the problems associated with the transmission time delay for a variety of transmission paths in a distributed antenna network. Remote antenna devices $21_1$, $21_2$, $21_3$ and $21_4$ are generally shown to be connected with a transmission medium interface 32 by transmission paths $31_1$, $31_2$, $31_3$ and $31_4$ respectively. The transceiver unit 10 may communicate with a mobile 35 over this network. As shown in FIG. 3, each of the four transmission paths may have different lengths which cause different delay times for the signals. Also, each of the four transmission paths may have different transmission media that also affects the amount of delay time. All known techniques used for equalizing the delay time of transmission paths in a distributed antenna network require manual intervention with specialized equipment. Known examples of equalization techniques include physically adding extra lengths of cable to the transmission path so that the delay times of the shorter transmission paths all become equal to the delay time of the longest transmission path, and adding to the length of the electrical transmission path by the use of active and passive phase lag circuits, surface acoustic wave (SAW) delay devices, or digital intermediate frequency stage circuits for buffering.

These known delay time adjusting techniques for the transmission paths all include manual processes in which the delay time for each transmission path is measured using specialized equipment for such measurements. After manually measuring the delays of the transmission paths, the appropriate delay can be added to the appropriate transmission path so that the delay times for all of the transmission paths are equal. However, these known equalization techniques produce some undesirable problems. For instance, each of these known equalization techniques requires that transmission paths be out of service while the delay is measured and necessitates a further shutdown of service for updating and adjusting after a need is detected, such as any time after repairing or upgrading a transmission path. Furthermore, these known techniques do not take into account possible changes in the transmission media characteristics due to environmental variations such as temperature. Therefore, the network cannot be actively adjusted for these changes.

SUMMARY

One object of the present invention therefore is to provide a system and method for equalizing the delay associated with the transmission media which connects a plurality of remote antenna units to a central unit or a base station in a distributed antenna network.

Another object of the present invention is to provide a system and method for detecting the delay of each separate transmission path for the remote antenna units and then adjusting the delay factors for the remote antenna unit in response to this detection so that all of the associated delay time is equalized.

A still further object of the present invention is to provide a system and method for equalizing delay time with a loopback mechanism in the distributed antenna network which measures the amount of round trip time delay by sending a pulse pattern or the like from a transceiver to the remote antenna units on the downlink path. Thereafter, the time until the pulse pattern is received back from the loopback mechanism on the uplink path may be counted and then the delay parameters for the network can be updated without any physical intervention by an operator when all of the transmission paths have been detected. Furthermore, bursts are synchronized so that the air frame timing between cells served by the remote antenna units is enhanced and the hand-off performance therebetween is improved.

According to one aspect of the present invention, the foregoing and other objects are attained in a communication system and method for equalizing delay time in a distributed antenna network. The system comprises a plurality of remote antenna units, a central unit or a base station connected to the remote antenna units by transmission media, where each connection between the base station and one of the remote antenna units forms a separate transmission path having an associated delay time, a delay detector for determining the associated delay times of the separate transmission paths, and a delay compensator for adjusting the associated delay times in response to the delay detector so that all of the associated delay times are substantially equalized. The system and method allow the delay parameters for the entire network to be set upon installation and then to be periodically updated without physical intervention by an operator. The detection and compensation allow equalization of delay time differences that could not otherwise be compensated in the base stations or mobile stations of conventional systems and methods.

According to another embodiment of the present invention, the foregoing and other objects may be attained in a communication system and method that further comprise sending a predetermined pulse pattern to a loopback mechanism for each of the remote antenna units and counting the time taken to transmit the predetermined pulse pattern on an uplink path of the loopback mechanism for each of the remote antenna units. By measuring the round-trip delay time for each of the remote antenna units and then sending that delay time back to the base station or the central unit, the delay compensator is able to adjust the delay parameters and equalize the delay times of all of the remote antenna units. As a result, transmission paths having different lengths or types of transmission media may be equalized and the signals will be properly processed with minimal intersymbol interference.

In another embodiment of the present invention, the delay detector may be positioned in the transmission path between the central unit or base station and the remote antenna units. In practice, the delay detector should be positioned at either the central unit/base station or the remote antenna unit with each position having associated advantages.

BRIEF DESCRIPTION OF THE DRAWINGS

The present invention will become more fully understood by reading this description in conjunction with the accompanying drawings, which are given by way of illustration only, and thus are not limitative of the present invention, wherein.

DETAILED DESCRIPTION

This invention is directed to a system and method which actively equalize the delay times associated with transmission paths between a central unit or base station and remote antenna units in a distributed antenna network. In distributed antenna networks where digital modulation is commonly used, communication signals are often received by more than one of the remote antenna units and intersymbol interference is likely to occur without the proper equalizing compensation. As CATV infrastructures become more widely used for cellular-like communication networks, the transmission paths for the communication signals are more likely to widely vary with respect to the lengths of the transmission paths and the types of media used for the transmission paths. When the lengths and types of the transmission media become significantly different for each connection to the remote antenna unit, the differences between the delay times for each of these transmission paths may increase to the point where intersymbol interference is created that is beyond the compensation capabilities of the equalizers at the base or mobile stations. Therefore, the system and method of the present invention equalize the delay times in response to each delay time detection for the transmission paths to all of the remote antennas in a distributed antenna network. These delay time detections may be performed upon installation and periodically thereafter at scheduled intervals or as problems in the system operation arise. The equalization system and method of the present invention also provide greater ease and flexibility in adjusting the delay parameters so that they may be updated without physical intervention by an operator.

Figure 4:
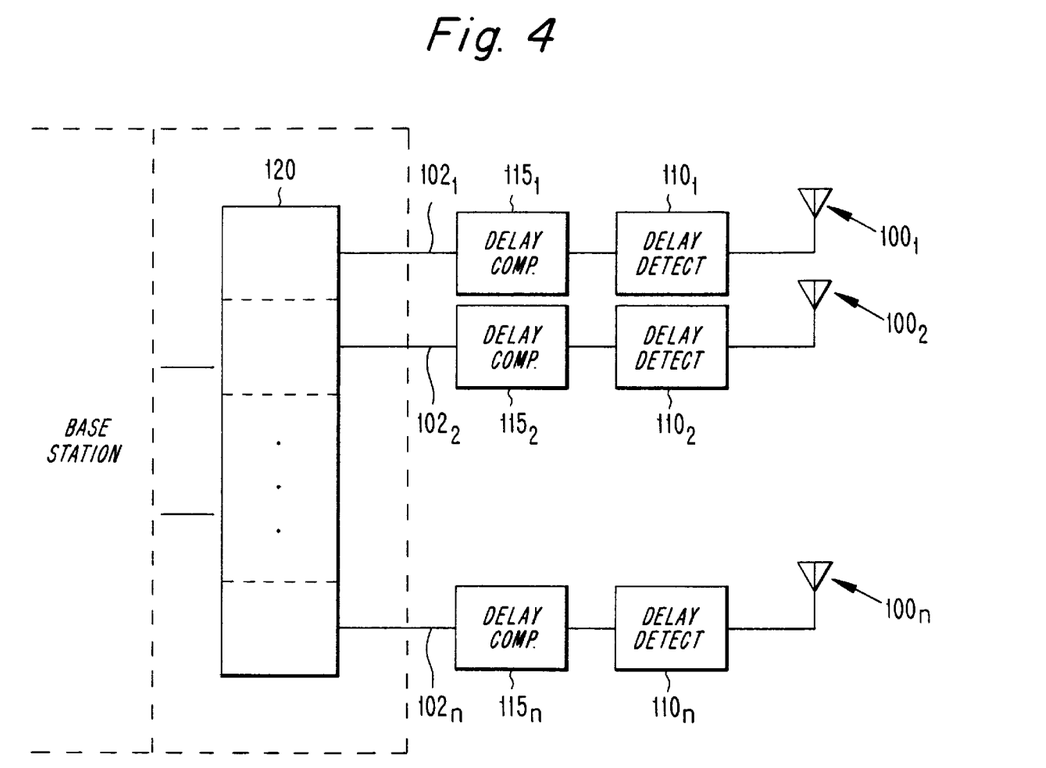
FIG. 4 is a block diagram showing a system for equalizing delay in a distributed antenna network according to an embodiment of the present invention.

Referring to FIG. 4, the main components for actively equalizing the delay times between remote antenna units and the base station in a distributed antenna network are illustrated according to one embodiment of the present invention. A plurality of remote antenna units $100_1, 100_2, \ldots 100_n$ are shown connected to transmission paths $102_1, 102_2, \ldots 102_n$. The transmission paths $102_1, \ldots 102_n$ are connected to a central unit 120 which may be incorporated into a base station or connected to the base station. The central unit 120 may include a plurality of segmented units, each corresponding to a respective one of the remote antenna units $100_1, \ldots 100_n$, or the central unit 120 may be a single unit that receives the inputs from each of the remote antenna units $100_1, \ldots 100_n$, depending upon the implementation constraints. The central unit 120 includes a processing unit (computer, microprocessor, CPU, PC or the like) for receiving delay time information for the remote antenna units $100_1, \ldots 100_n$, processing this information, and generating control signals for equalizing the delay time for the remote antenna units. For instance, a microprocessor connected to a modulator/demodulator may be used to generate pulse signals which are sent to the remote antenna units. The microprocessor may then measure the time delay based on the returned pulse signals.

To actively equalize the delay times in the distributed antenna network, delay detectors $110_1, 110_2 \ldots 110_n$ and delay compensators $115_1, 115_2 \ldots 115_n$ are respectively positioned along each of the transmission paths $102_1, 102_2, \ldots 102_n$. The positioning of the delay detectors $110_n$ and the delay compensators $115_n$ are interchangeable. The time delay error may be first determined by the delay detectors $115_n$ and then adjusted by the delay compensators $115_n$, or alternatively, the time delay may be adjusted by the delay compensators $115_n$ until no time delay error is determined to be present by the delay detectors $110_n$. In practice, the physical placement of the components for performing the delay detection and compensation functions should be incorporated in the central unit 120 or the remote antenna units $100_1 \ldots 100_n$ so that the installation complexities are reduced. When the delay detectors $110_1, \ldots 110_n$ and the delay compensators $115_1, \ldots 115_n$ are incorporated into their respective antenna units $100_1, \ldots 100_n$, the delay control for the network is maximized. However, this configuration requires each of the remote antenna units $115_n$ to be individually calibrated and additional hardware must be included in each unit which increases costs.

If the delay detectors $110_1, \ldots 110_n$ and the delay compensators $115_1, \ldots 115_n$ are incorporated into the central unit 120, the complexity and costs associated with installing hardware in each of the remote antenna units are eliminated, while adequate delay control is still provided. It will be appreciated that the delay detector can be located at the remote antenna unit and the delay compensator can be located at the central unit, or the delay compensator can be located at the remote antenna unit and the delay detector can be located at the central unit.

Figure 5:
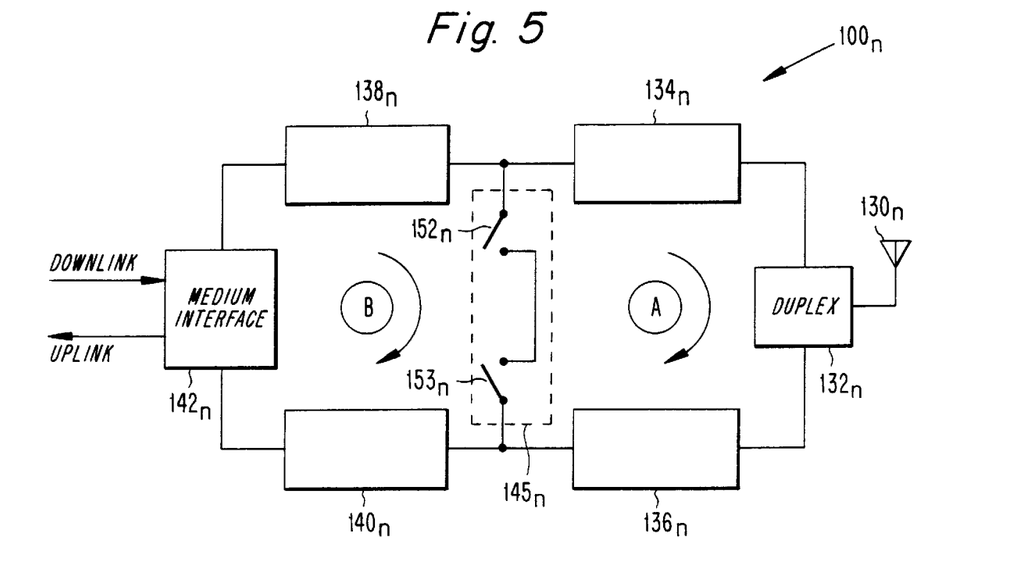
FIG. 5 is a block diagram of a loopback mechanism for one of the remote antenna units according to an embodiment of the present invention.

FIG. 5 illustrates a block diagram for a remote antenna unit $100_n$ according to one embodiment of the present invention. An antenna $130_n$ is connected to a duplexer $132_n$ which is connected to radio circuitry $134_n$ and $136_n$ that forms a normal path A. A loopback mechanism $145_n$ selectively forms a loop path B for measuring the round-trip delay time.

The loop path B includes radio circuitry $138_n$ and $140_n$ which are connected to the transmission paths $102_n$ by a medium interface $142_n$. The radio circuitry $134_n, 136_n, 138_n$, and $140_n$ includes standard radio components such as channel filtering, amplifying and frequency converting circuitry. The loopback mechanism $145_n$ includes switches $152_n$ and $153_n$ that are jointly controlled by a central unit for all of the remote antenna units of a network. The switches $152_n$ and $153_n$ are closed when the loop path B is desired to be used and opened when the loop path A is desired to be used. In one example of the present invention, a common controller for the radio in the remote antenna unit may be modified to provide the logic for controlling the switches $152_n$ and $153_n$. However, it will be appreciated that the switches $152_n$ and $153_n$ may be controlled by other techniques. For instance, a decoder may be used to detect bit patterns and then to generate signals for opening or closing the switches $152_n$ and $153_n$ responsive to the detected bit patterns.

To measure the round-trip delay time, a pulse or other identifiable pattern may be sent from the central unit 120 and the delay detector $110_n$ on the downlink path through the loop path B. The time elapsed between sending the pulse and receiving the pulse back on the uplink path is determined by the delay detector $110_n$. In addition to direct timing, other methods are possible to measure the round-trip delay time. For example, a continuous pattern of pulses separated by a delay may be sent from the central unit 120 to each of the remote antenna units. Thereafter, a synchronizer algorithm may be applied to the returning stream and the delays adjusted by the delay compensators until synchronization for all of the remote antenna units is achieved. As a result, the system has the capability to set the delay parameters for the entire network at installation and to update the delay parameters by a system controller without physical intervention by an operator.

Figure 6A:
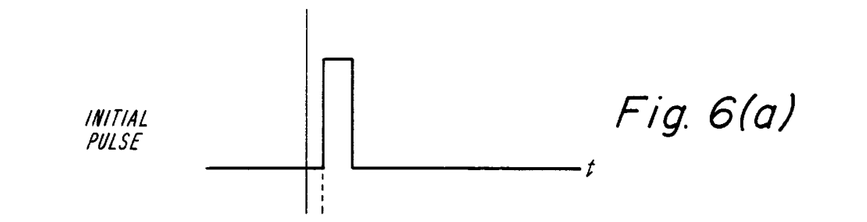
FIGS. 6(a) and (b) are timing diagrams illustrating a delay measurement by the loopback mechanism.
Figure 6B:
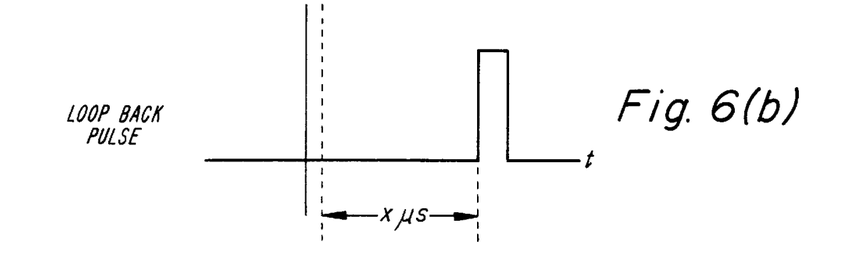

FIGS. 6(a) and (b) are timing diagrams representing a pulse used to determine the delay time. FIG. 6(a) illustrates the initial pulse sent on the downlink path and FIG. 6(b) illustrates the delay time, typically on the order of x microseconds, of the round-trip delay time for the loop path B. By actively adjusting the delay parameters responsive to this detection, variations in the length and types of media used in the transmission paths may be readily compensated. This is important when the differences in the delay times are significant and cause intersymbol interference that cannot be compensated by base or mobile stations of conventional systems. For instance, if a CATV propagation delay between adjacent remote antenna units is more than 16 microseconds, intersymbol interference occurs that cannot be compensated by the equalization capabilities of conventional systems.

Figure 7:
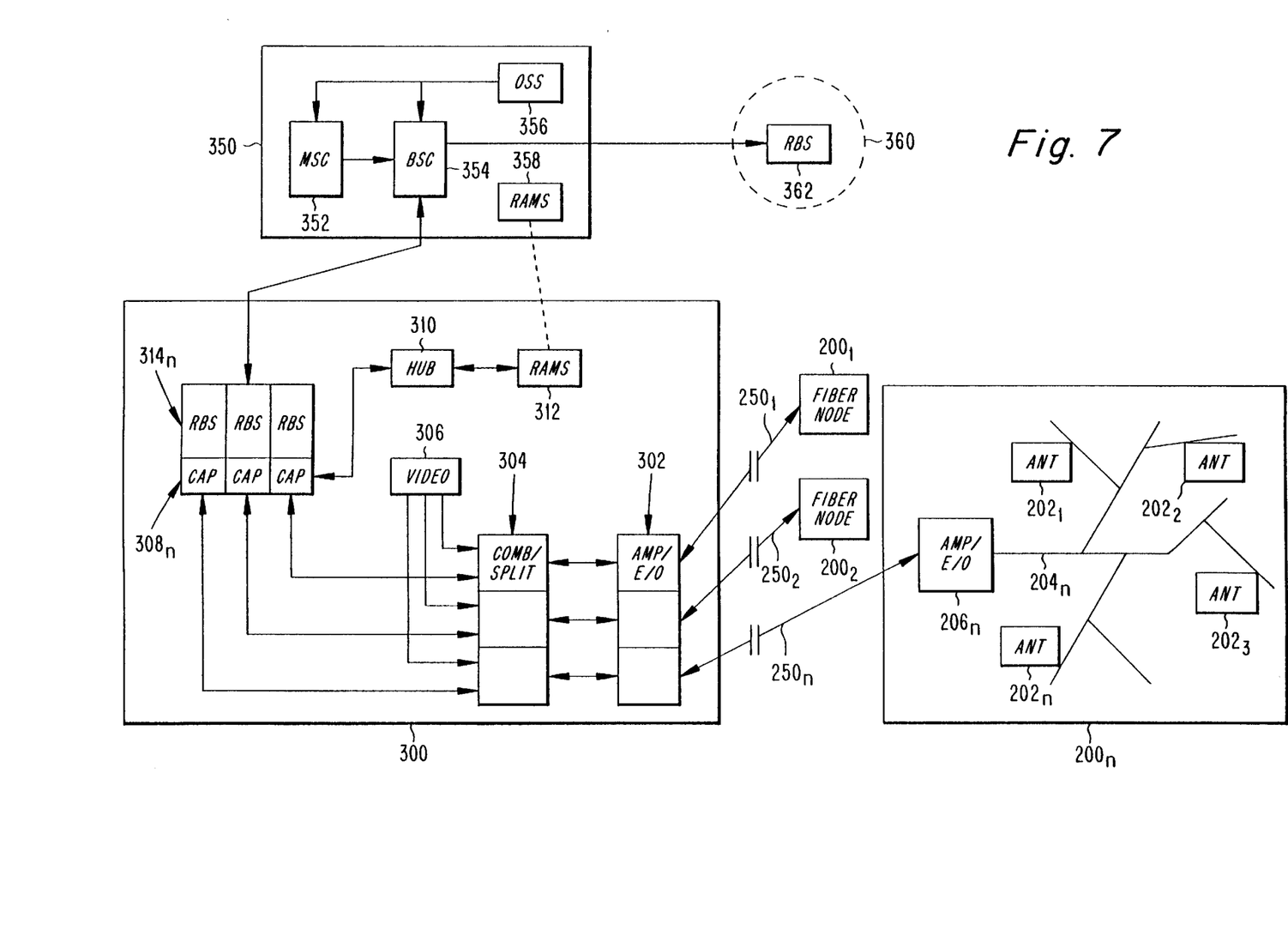
FIG. 7 is a block diagram showing a system infrastructure in which a delay equalization system according to the present invention is implemented.

FIG. 7 illustrates an example of a CATV system infrastructure that may advantageously utilize Applicants' system and method for equalizing delay. The infrastructure includes fiber nodes $200_1, \ldots 200_n$ which are connected to a CATV head-end 300 by respective optical fibers $250_1, \ldots 250_n$. The CATV head-end 300 may support a number of fiber nodes $200_1, \ldots 200_n$, each of which may generally support approximately 500 to 1500 homes or subscribers through a plurality of remote antenna units $202_1, \ldots 202_n$. The remote antenna units $202_1, \ldots 202_n$, are respectively connected by the optical fibers $250_1, \ldots 250_n$ to the CATV head-end 300. Also, a plurality of the remote antenna units $202_1, \ldots 202_n$ are connected to an amplifying and optical/electrical converting circuit $206_n$ by coaxial cabling $204_n$.

The CATV head-end 300 includes an amplifying and electrical/optical converting circuit 302 which is used for interfacing the CATV head-end 300 to the optical fibers $250_1, \ldots 250_n$. The amplifying and electrical/optical converting circuit 302 is connected to combining and splitting circuitry 304 which is connected to a video source 306 and cable access processing (CAP) units $308_1, \ldots 308_n$ which at least correspond in number to the fiber nodes $200_1, \ldots 200_n$ in the system. The CAP units $308_1, \ldots 308_n$ are connected to radio base stations (RBS) $314_1, \ldots 314_n$ and a hub 310. The hub 310 is further connected to a remote antenna management system (RAMS) 312. The CAP units $308_1, \ldots 308_n$ are also connected to an operation support system/switching center (OSS/SC) 350. The OSS/SC 350 includes a mobile switching center 352, a base station controller 354, an operation support system 356 and its own RAMS 358. The RAMS 358 of the OSS/SC 350 may communicate with the RAMS 312 of the CATV head-end 300 so that a plurality of CATV head-ends may be controlled at a central location. The base station controller is also connected to a macrocell 360 which includes a (RBS) 362. The CAP units $308_1, \ldots 308_n$ provide the frequency conversion and power level adjustments for placing telephony carrier signals on the CATV infrastructure as well as controlling and monitoring the status of the remote antenna units $202_1, \ldots 202_n$.

The remote antenna units $202_1, \ldots 202_n$ are located in desired areas and convert the CATV base communication signals back to their proper air frequencies and power levels. Each of the remote antenna units $202_1, \ldots 202_n$ is associated with a specific transceiver radio unit (TRU) in the RBS $314_1, \ldots 314_n$ so that the CATV network is totally transparent to the radio operation. The operating frequencies of the CAP units $308_1, \ldots 308_n$ are set to exactly match the operating frequencies of the remote antenna transmitters. Up to six TRUs in a specific one of the RBS $314_1, \ldots 314_n$ feed a single one of the CAP units $308_1, \ldots 308_n$ which in turn serves several fiber nodes $200_1, \ldots 200_n$ in the CATV network. A combiner within the CAP units $308_1, \ldots 308_n$ provide six transmit input ports from the RBS $314_1, \ldots 314_n$ in order to support a maximum of six TRUs. The CAP units $308_1, \ldots 308_n$ convert the telephony carrier signals to CATV frequency signals and feed them to the CATV head-end 300 over a bidirectional coaxial cable.

In the CATV head-end 300, the telephony carrier signals are combined with the video signals and both signals are transmitted over the fiber optic cables $250_1, \ldots 250_n$ to fiber nodes $200_1, \ldots 200_n$. At the fiber nodes $200_1, \ldots 200_n$, the signals are converted back to electrical signals and distributed over a tree and branch coaxial network. Each individual one of the remote antenna units $201_1, \ldots 202_n$ taps off the coaxial cabling $204_n$, filters the carrier signals, converts the frequency and transmits the carrier signals over the air interface. The video signals continue unaltered to each CATV subscriber. For the uplink, the remote antenna units $202_1, \ldots 202_n$ receive two diversity signals from the air, downconvert the frequency, and transmit the different frequency diversity carrier signals over the CATV infrastructure. In the CATV infrastructure at the fiber nodes $200_1, \ldots 200_n$, the electrical signals are converted to optical signals and transmitted back to the CATV head-end 300. These signals are then converted back to electrical signals and routed to the CAP units $308_1, \ldots 308_n$ over the bidirectional cable. The CAP units $308_1, \ldots 308_n$ convert the uplink carrier signals back up to frequencies for input to the TRUs. The CAP units $308_1, \ldots 308_n$ receive digital control information from the RAMS 312 and forward remote antenna control information to the desired one of the remote antenna units $202_1, \ldots 202_n$.

The fiber node delay compensation can be accomplished by inserting variable delay elements in the signal paths between the CAP units $308_1, \ldots 308_n$ and the remote antenna units $202_1, \ldots 202_n$. The variable delay element circuitry may be practically placed in either the remote antenna units $202_1, \ldots 202_n$ or the CAP units $308_1, \ldots 308_n$. As previously discussed, if the variable delay element circuitry is installed at the remote antenna units $202_1, \ldots 202_n$, the flexibility for delay control at each remote antenna unit is maximized but individual hardware and calibration is necessary at each of the remote antenna units which will lead to increased costs and complexity during installation and upgrade. Therefore, positioning the variable delay element circuitry at the CAP units $308_1, \ldots 308_n$ is desirable to reduce costs because the supporting circuitry is already present. Even though the time delay for each remote antenna unit is not individually controlled when the delay element circuitry is positioned at the CAP units $308_1, \ldots 308_n$, each remote antenna unit within a fiber node $200_n$ will have the same amount of delay control. This provides adequate control because the fiber optic cables $250_n$ between the CATV head-end 300 and the fiber nodes $200_n$ are usually the largest contributing component to the amount of delay time. In other words, the lengths of the fiber optic cables $250_n$ are significantly greater than the lengths of the coaxial cabling $204_n$ within the fiber nodes $200_n$. Therefore, compensating for the delay associated with the fiber optic cables $250_n$ will provide adequate delay control in most instances.

Figure 8A:
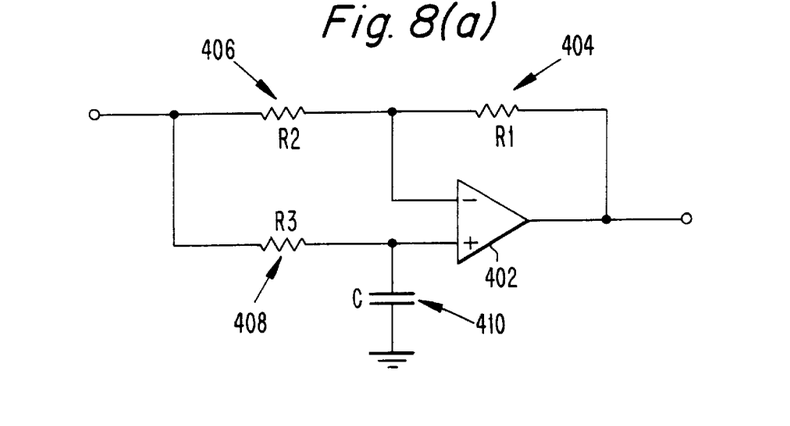
FIGS. 8(a), (b) and (c) illustrate delay compensators that may be used in embodiments of the present invention.
Figure 8B:
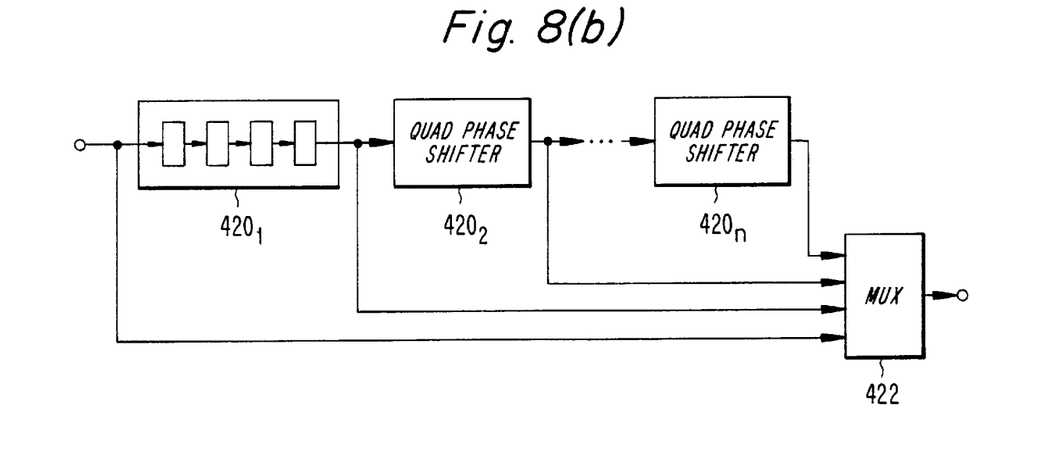
Figure 8C:
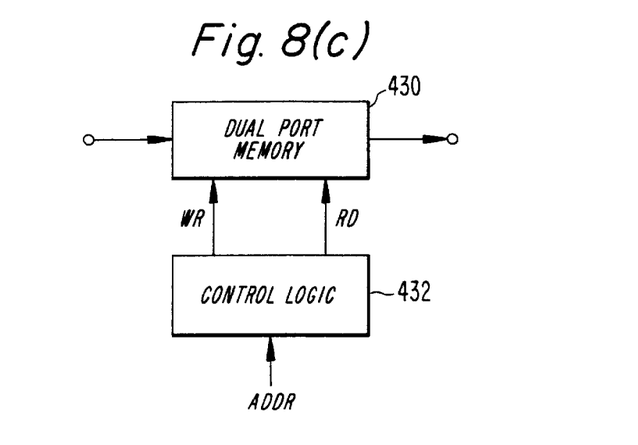

FIGS. 8(a), (b) and (c) illustrate possible variable delay elements that may be used for the delay compensator in embodiments of the present invention. A constant amplitude phase shifter circuit is illustrated in FIG. 8(a). This circuit includes an op amp 402, resistors R1, R2 and R3 404, 406 and 408 and a capacitor C410. The phase lag introduced by this circuit is determined by the resistors R1, R2 and R3 404, 406, and 408 and the capacitor C410. The phase lag is about 170 degrees at an operating frequency of $10\omega RC$. At the IF operating frequency, a phase shift of 170 degrees corresponds to about 1 microsecond of delay.

In FIG. 8(b), a chain of constant phase shifter circuits is illustrated. A plurality of quad phase shifters $420_1, \ldots 420_n$ are connected to a multiplexer 422. Each of the quad phase shifters $420_1, \ldots 420_n$ may include four quad op amps per package. The multiplexer 422 is controlled by digital logic for selecting one of several delay taps to provide delay adjustment. By using four quad op amps, up to 16 microseconds of delay can be provided in 4 microsecond steps. Alternatively, an analog ASIC using standard cells instead of discrete op amps may be used and several complete delay chains can be implemented in a single IC.

In still another aspect, units which utilize an ADC and DAC to create a digital IF section may obtain a delay circuit by inserting high speed FIFOs in the digital IF section of a device with the FIFOs being selected to operate at the desired sampling rate. The delay of the FIFOs are adjusted by controlling the depth of the FIFOs. The FIFOs may be selected with programmable depth registers that activate a signal when the FIFOs are at a certain depth. Digital logic controls the read and write clocks so that the programmable depth is maintained. A FIFO with a depth of 1K provides up to a 51 microseconds of delay time at the desired sampling rate. Alternatively, a digital implementation using a high speed dual port memory device instead of FIFOs may be used to store samples. FIG. 8(c) illustrates a dual port memory 430 connected to control logic 432. Read and write addresses are input to the dual port memory 430 and an address offset is input to the control logic. Thereby, read and write address signals maintain an adjustable offset from each other. By changing the offset, delay throughout the circuit may be varied.

In distributed antenna networks, the use of multicasting provides more efficient use of radio resources to cover a small areas by remote antenna units. However, when digital modulation is used in such networks and a signal is received by more than one of the remote antenna units, intersymbol interference may occur if the transmission paths for the remote antenna units are significantly different. The present invention is directed to compensating for the delays in the transmission paths due to differences in their path lengths or types of transmission media so that the delay times for all of the transmission paths are substantially equalized. The present invention also enhances air frame timing between cells served by the remote antenna units which improves hand-off capabilities therebetween. Another advantage of the system and method of the present invention is to perform this equalization actively without using any specialized equipment and without requiring the transmission link to be out of service during the upgrades or repairs. The equalization of the distributed antenna network also provides compensation due to environmental variations, such as temperature, to be performed which cannot be readily adjusted in the known systems.

The invention being thus described, it will be obvious that the same may be varied in many ways. Such variations are not to be regarded as a departure from the scope of the invention, which is determined by the following claims. All such modifications that would be obvious to one skilled in the art are intended to be included with the scope of the following claims.

What is claimed:

1. A communication system for automatically equalizing time delay in a distributed antenna network, comprising:

a plurality of remote antenna units;

a central unit connected to said remote antenna units by transmission lines, each connection between said central unit and one of said remote antenna units forming a separate transmission path having an associated delay time;

a plurality of delay detectors for determining the associated delay time of said separate transmission paths for each of said remote antenna units;

a delay compensator for adjusting the associated delay time for each of said remote antenna units in response to said delay detectors so that all of the associated delay times are substantially equalized;

a pulse generator for sending a predetermined pulse pattern to a loopback mechanism for each of said remote antenna units; via said transmission lines and a timer for counting the time taken to transmit said predetermined pulse pattern on an uplink path of said loopback mechanism for each of said remote antenna units.

2. A communication system according to claim 1, further comprising a pulse generator for sending a pattern of pulses separated by a delay to a loopback mechanism for each of said remote antenna units; and a synchronization controller for comparing said patterns of pulses for each of said remote antenna units and adjusting the delays until said pattern of pulses for each of said remote antenna units are synchronized.

3. A communication system according to claim 1, wherein said delay compensator comprises a delay element connected to said transmission lines for each of said remote antenna units.

4. A communication system according to claim 3, wherein said delay element comprises a constant amplitude phase shifter circuit.

5. A communication system according to claim 3, wherein said delay element comprises a FIFO circuit.

6. A communication system according to claim 3, wherein said delay element comprises a dual port memory device.

7. A communication system according to claim 1, wherein said transmission lines comprises fiber optic cables and coaxial cables.

8. A communication system according to claim 1, wherein said central unit is formed in a base station.

9. A communication system according to claim 1, wherein said central unit is connected to a base station.

10. A communication system according to claim 1, wherein said central units comprises a plurality of central units corresponding to each of said remote antenna units.

11. A communication system according to claim 10, wherein said central units each include one of said delay detectors.

12. A communication system according to claim 1, wherein said remote antenna units each include one of said delay detectors.

13. A method for automatically equalizing time delay in a distributed antenna network, comprising the steps of:

(a) connecting a plurality of remote antenna units to a central unit by transmission lines, each connection between said central unit and one of said remote antenna units forming a separate transmission path having an associated time delay;

(b) determining the associated delay time of said separate transmission paths for each of said remote antenna units;

(c) adjusting the associated delay time for each of said remote antenna units in response to said step (b) so that all of the associated delay times are substantially equalized;

(d) sending a predetermined pulse pattern to a loopback mechanism for each of said remote antenna units: via said transmission lines and (e) counting, through the use of a timer, the time taken to transmit said predetermined pulse pattern on an uplink path of said loopback mechanism for each of said remote antenna units.

14. A method according to claim 13, further comprising the steps of:

(d) sending a pattern of pulses separated by a delay to a loopback mechanism for each of said remote antenna units;

(e) comparing said pattern of pulses for each of said remote antenna units; and (f) adjusting the delays until said pattern of pulses for each of said remote antenna units are synchronized.

* * * * *